United States Patent [19]

Lufkin

[11] 4,212,133
[45] Jul. 15, 1980

[54] PICTURE FRAME VASE

[76] Inventor: Lindsey D. Lufkin, 991 Waimanu St., Honolulu, Hi. 96814

[21] Appl. No.: 558,372

[22] Filed: Mar. 14, 1975

[51] Int. Cl.² .......................... A01G 5/00; A47G 1/24; G09F 19/00

[52] U.S. Cl. .................................. 47/41 R; 248/488; 428/13; 40/152

[58] Field of Search ................................. 47/41–41.13, 47/35; 40/152–160; 428/13, 17, 23, 76; 248/27.8, 488–490; 119/5

[56] References Cited

U.S. PATENT DOCUMENTS

| | | | |
|---|---|---|---|
| 1,600,327 | 9/1926 | Evans | 40/160 X |
| 3,715,823 | 2/1973 | Brossard | 40/152 |
| 3,740,016 | 6/1973 | Buescher | 248/488 |
| 3,789,528 | 2/1974 | Knoell et al. | 40/152 |
| 4,106,742 | 8/1978 | Miller et al. | 248/488 |
| 4,145,826 | 3/1979 | Shaw | 40/152 |

Primary Examiner—Robert E. Bagwill
Attorney, Agent, or Firm—James Creighton Wray

[57] ABSTRACT

In a picture frame vase, a picture frame surrounds a board made of attractive material, and the board has a rectangular opening below a center. A water pocket is mounted on the back of the board just below the rectangular opening, so that stems of flowers may be inserted through the rectangular opening and into the water pocket. The narrow pocket holds the stems inward so that the flowers, standing upright, generally lie along the face of the board. The frame in a preferred embodiment is made with sufficient depth so that the frame, and not the water pocket, contacts the wall. The size of the frame and size and shape and position of the opening are variable, and the water pocket size, shape and position are changeable. One frame, face, board and pocket are a completely molded one-piece unit. A frame has a mirror finish to enhance the appearance of the device when it supports flowers.

4 Claims, 4 Drawing Figures

PICTURE FRAME VASE

BACKGROUND OF THE INVENTION

Before filing a patent application a search was made in the United States Patent Office. The search covered United States patents in Class 47, Plant Husbandry, particularly flower holders in subclasses 41, 41.1, 41.11, 41.12 and 41.13 and Plant Receptacles in subclasses 34, 35 and 36. The search also included patents in Design Class 29, Fine Arts, Vases in subclass 28 and Plant Pots in Design Class 35, subclass 3. Also searched were Picture Frames in Design Class 6, subclasses 232, 233 and 246. In the Design Classes through unofficial publications collected by the examiner were searched as well as United States Patents.

Examples of the most pertinent patents that were found are U.S. Pat. Nos.:

342,675, Braddock,
2,686,988, Garber,
2,695,473, Lynch,
1,518,207, McCauley,
2,486,848, Huck,
2,887,824, Riva.

U.S. Pat. No. 342,675, shows a board with a central aperture tipped against a vase. The face of the board forms a backdrop for a flower whose stem is inserted through the aperture into the vase. That device is quite different from the present invention, since it would be impossible to hang the apparatus of U.S. Pat. No. 342,675 on a wall.

U.S. Pat. No. 2,686,988 shows a shadow box which is a planter with a surrounding frame and a backing board extending upward from the planter. The device is different from the present invention because the planter is dominant, and it would be impossible to reverse the device and to hang it against the wall.

U.S. Pat. No. 2,695,473 describes a plate holder with a rearward mounted water take for mounting on a wall. The flowers or greenery extend around the plate rather than through the plate.

U.S. Pat. No. 1,518,207 discloses a picture mount with a hole in the back for inserting a flower vial. That is not the same as the present invention.

Of interest for its showing of a vase mounted on a board in U.S. Pat. No. 338,845. In that patent the vase is mounted in front of the board which is mounted on an easel-like device.

U.S. Pat. No. 2,887,824 shows a vase mounted on a framed surface, such as a window. That vase is different from the present invention, because it requires a window for a part of the vase, and because it is mounted on a frontal side of a window.

U.S. Pat. No. 3,486,848 illustrates a coat lapel with a buttonhole, through which a flower stem is inserted. The stem is lodged in a vial having a pin for pinning on the rear of a coat lapel.

None of those patents shows or suggests the present invention.

A need exists for a decorative flower vase which lies flat against a vertical surface and which may be hung on a wall to support flowers flat against a wall.

SUMMARY OF THE INVENTION

A one piece picture frame has no picture but has a small water pocket on the back side. An opening in the picture area allows stems of flowers to pass from the front of the frame to the back side of the frame, where there is a water pocket directly beneath the opening. The flower stems are placed in this water pocket creating a wall hanging flower vase or flower frame.

In one embodiment, a one piece picture frame vase is made entirely of plastic. The picture area is a thin sheet of a neutral color, with the water pocket molded in on the back. The frame around the picture area preferably projects both to the front and the back, and projects at least to the back, to provide space for the water pocket with the frame flat against the wall. In one embodiment, the frame is of the same color as the picture area. Preferably the frame is constructed in a darker color to more nearly simulate a real frame. A simple device is molded in to enable hanging of the flower frame; the whole item is complete and self-contained.

The size of the flower frame is relative to the flowers of its intended use. Several different sizes are provided. The size, shape and position of the opening is variable, as are parameters of the water pocket. In one embodiment, picture face area is done in a mirror finish, thus enhancing the impact of the actual flowers.

A preferred embodiment of the invention, a picture frame flower vase is constructed with a flat vertically mounted plate with an opening in a central portion of the plate. Preferably the opening is slightly below a center of the plate and is horizontally disposed. Preferably the opening in the plate is a generally rectangular opening with a large horizontal dimension and a small vertical dimension. A frame extends around the plate and extends transversely to the plate in at least a rearward direction.

A container is mounted on a rear face of the plate beneath the opening. In a preferred embodiment, the container has an upward opening commensurate with the opening in the plate. Preferably, the container is relatively wide in a direction along the frame and is narrow in a direction transverse to the plate. In one embodiment, the container extends rearward from the plate a distance communsurate with a rearward extension of the frame from the plate, so that the frame rests against the wall completely around the plate. In a preferred embodiment, the container extends slightly less rearward from the plate than does the frame, so that the container does not touch a wall on which the frame rests.

Flowers are placed along a front face of the picture vase, and their stems are slid downward through the rectangular opening in the frame and into the upward opening of the container. The narrow rearward dimension of the container holds the stems so that the flowers remain upright along a front surface of the picture vase.

A preferred form of a hanger is a plate which is mounted in an upward rearward extending portion of the frame with the plate extending downward inside the frame spaced from the plate and spaced from a rearward surface of the frame. The plate has serrations in its lower edge so that a notch in the serrations may be placed on a nail, permanently mounted on a wall. The positioning of the notched mounting plate is approximately along a line of the center of gravity which takes into account the weight of the main plate, the water-filled container, and the frame. If a nail is mounted in the wall horizontally, the entire assembly rests upon the nail without bearing the plate against the wall. If the nail is slightly angled into the wall, the assembly slides downward and rearward along the nail until the frame uniformly rests against the wall.

An alternate form of hanging means is a conventional cable connected to eyes on the frame.

In a preferred form of the invention, one surface of the plae is coated with a reflective material so that the beauty of the flowers is reflected outward from the front face. Preferably this is accomplished by depositing a silver coating on the front face of the plate. When the plate is transparent, the silver plating may be deposited on the rearward face of the plate.

An object of the invention is the provision of a picture vase having a vertically oriented decorative plate having an opening positioned in a central portion of the plate and having a frame surrounding the plate and extending outward from the plate, means connected to the frame for hanging the frame with the plate disposed vertically on a wall and having a container mounted on a rear surface of the plate, the container having an upward opening adjacent the opening in the central portion of the plate, whereby flowers positioned on the front of the plate and having stems extending downward and rearward through the opening in the central portion of the plate and into the opening in the container are held and watered by the container.

Another object of the invention is the provision of a picture vase apparatus with a flat laterally extended container mounted flush on a rear of a picture plate beneath an opening through the plate.

The invention has as another object the provision of a picture vase apparatus wherein a frame extends rearward from a plate for a distance at least equal to a thickness of a container, whereby the frame rests against a wall, around the container.

A further object of the invention is the provision of a picture vase apparatus wherein a frame extends rearward from a plate a distance greater than a thickness of a container, whereby the container is held displaced from a wall.

The invention has as a further object the provision of a picture vase apparatus with an opening in a central portion of a plate being a horizontally elongated opening, and wherein an upward opening in a container is a horizontally elongated opening commensurate with the horizontally elongated opening of the plate.

This invention has as another object the provision of a picture vase apparatus wherein a plate with an opening and a container behind the plate adjacent the opening are integrally formed of a plastic material.

Another object of the invention is the provision of a plate, a frame and a container behind the plate are integrally formed of a plastic material.

A further object of the invention is the provision of a picture vase apparatus wherein a face of the plate is coated with a highly reflective material to reflect light impinging on a front face of the plate.

These and other and further features and objects of the invention are apparent in the disclosure which includes the claims as a part of the above and ongoing specification and the drawings.

DETAILED DESCRIPTION OF THE DRAWINGS

Figure 1:
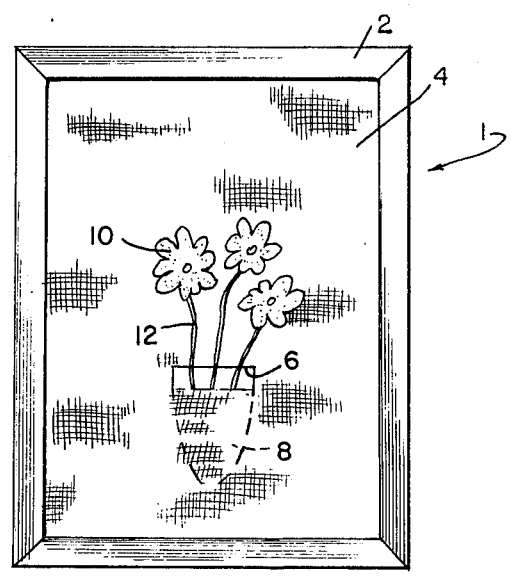
FIG. 1 is a front elevation of the picture vase apparatus of the present invention.
Figure 2:
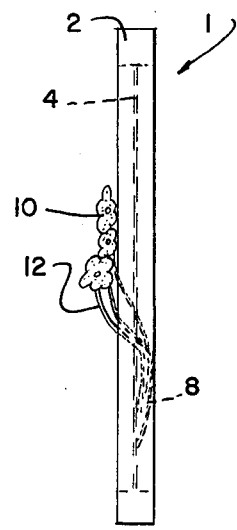
FIG. 2 is a side elevation of the picture vase of the present invention.

With reference to the drawings, a picture vase of the present invention is generally referred to by the numeral 1. The picture vase has a frame 2 which surrounds a plate 4. An opening 6 in a lower central portion of the plate is shown as a generally horizontally elongated rectangular opening. A container 8 is mounted on a rearward face of plate 4, such as by binding or by integrally forming the container with the plate. The container 8 has a relatively wide dimension parallel to the plate and relatively narrow dimension transverse to the plate. An upward of container 8 is commensurate with dimensions of the opening 6 in the plate.

Container 8 extends rearward from the plate 4 a distance similar to the rearward extension of frame 2, so that frame 2 rather than container 8 abuts a wall surface. Flowers 10 are positioned on a front face of the plate 4 with stems 12 of the flowers projecting rearward through opening 6 and downward through an upward opening into container 8. The narrow rearward dimension of container 8 holds the stems so that the flowers are disposed vertically along a frontal surface of plate 4.

Figure 3:
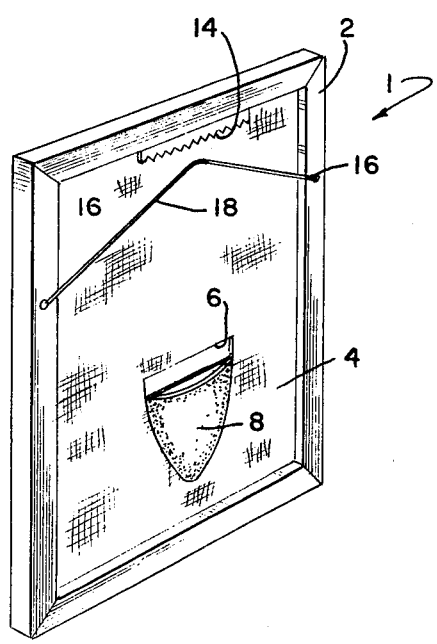
FIG. 3 is a rear prospective view of the picture vase shown in FIGS. 1 and 2.
Figure 4:
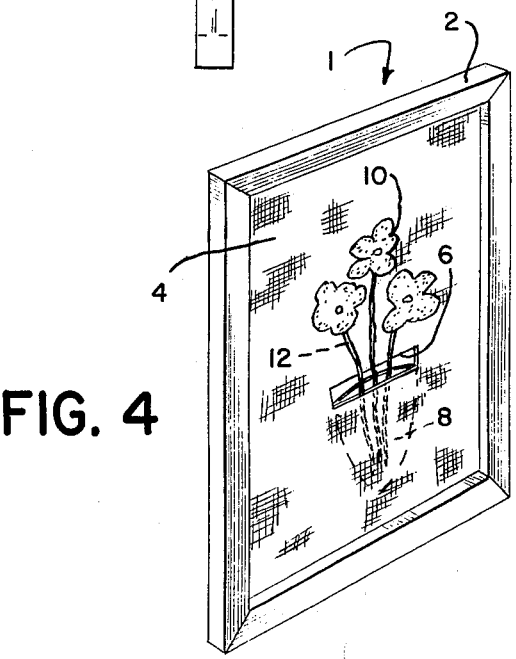
FIG. 4 is a prospective detail of the vase showing the flowers arranged in the picture vase.

As shown in FIG. 3, a preferred hanger is a plate 14 having downward serrations with notches for receiving a nail in one of several locations to balance the assembly. Preferably the hanger plate 14 is mounted inside the frame toward the plate 4 in a position approaching a center of gravity.

As an alternative to plate 14, eyes 16 are screwed into the frame, and a cable 18 is loosely looped between eyes 16 to provide a hanging wire.

In a preferred embodiment of the invention, the plate 4 and container 8 are made of a single unitary material, such as a moldable thermosetting plastic material. When the single piece of material is opaque, a frontal surface of plate 4 is silvered to reflect the beauty of the flowers. When the plastic material is transparent, the rearward face of plate 4 may be silvered to effect the same result. The latter construction is preferred when plate 4 and base 8 are separately constructed and are mounted together, such as by bonding a flat forward wall of container 8 to a rearward wall of plate 4.

In a preferred form of the invention, the container, plate and frame are molded integrally. Alternatively, the frame and plate may be molded together with the container 8 adhered to the rear face of the plate.

While the invention has been described with reference to specific embodiments, it will be obvious to those skilled in the art that modifications and variations of the invention may be constructed without departing from the spirit and scope of the invention. The scope of the invention is defined in the following claims.

I claim:

1. A picture vase comprising a relatively large vertically oriented decorative plate having a front face and a rear surface and having a generally rectangular opening with a larger horizontal dimension and a small vertical dimension positioned in a central portion of the vertically oriented plate and slightly below a center of the plate and having a frame surrounding the plate and extending outward from the plate, the frame extending forward from the front surface of the plate and rearward from the rear surface of the plate, means connected to the frame for hanging the frame with the decorative plate disposed vertically on a wall and having a relatively small water pocket container with an open top and a closed bottom and sides mounted on a rear surface of the plate, the water pocket container having an upward opening adjacent the opening in the central portion of the vertically oriented plate, wherein the container is a flat laterally extended container mounted flush on said plate beneath the opening, the container having an upward opening commensurate with the opening in the plate, the container being relatively wide in a direction along the plate and narrow in a direction transverse to the plate, and the container tapering laterally inward and downward, and the frame extends rearward from the plate for a distance greater than a thickness of the container, whereby the frame rests against a wall and whereby flowers positioned on the front of the plate and having stems extending downward and rearward through the opening in the container are held and watered by the water pocket container wherein the narrow rearward dimension of the container holds the stems so that the flowers remain upright.

2. The picture vase apparatus of claim 1 wherein the plate and container are integrally formed of a plastic material.

3. The picture vase apparatus of claim 1 wherein the plate, frame and container are integrally formed of a plastic material.

4. The picture vase apparatus of claim 1 wherein the front face of the plate is coated with a highly reflective material to reflect light impinging on a front face of the plate.

* * * * *